J. G. WEIR.
GEARED PROPELLER DRIVE FOR SHIPS.
APPLICATION FILED MAR. 5, 1914.
1,103,117.
Patented July 14, 1914.
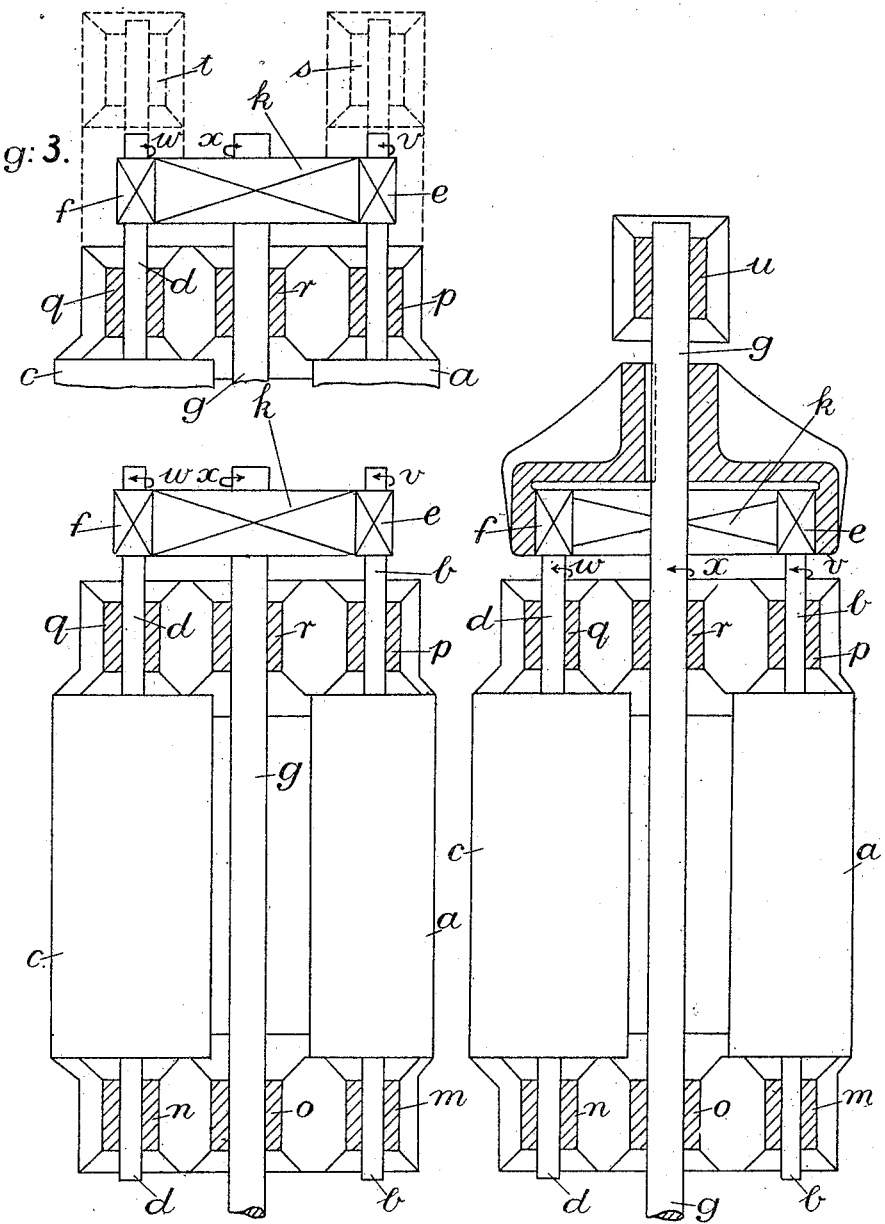

UNITED STATES PATENT OFFICE.

JAMES GEORGE WEIR, OF GLASGOW, SCOTLAND.

GEARED PROPELLER-DRIVE FOR SHIPS.

1,103,117.  Specification of Letters Patent.   Patented July 14, 1914.

Application filed March 5, 1914.  Serial No. 822,653.

*To all whom it may concern:*

Be it known that I, JAMES GEORGE WEIR, a subject of the King of Great Britain and Ireland, residing at Holm Foundry, Cathcart, Glasgow, Scotland, have invented certain new and useful Improvements Relating to Geared Propeller-Drives for Ships, of which the following is a specification, reference being had to the accompanying drawings.

This invention relates to the driving of the propeller shafts of ships through mechanical gearing.

The prime mover or movers employed to provide the mechanical work for driving the propeller shaft of a ship through mechanical gearing necessarily involves or involve a rotating shaft or shafts which carries or carry one member or members of the gear—say a toothed pinion—which engages or engage with the other member of the gear—say a toothed wheel—carried on, or coupled to, the propeller shaft. It is desirable that the axis of the one member of the gear should be maintained in correct position relatively to the axis of the other member, *i. e.*, the member with which it engages. To be more precise, it is desirable that, in the case of cylindrical or parallel-faced toothed gear wheels, the axis of the driving pinion should be maintained parallel to the axis of the driven wheel with which it meshes to a very great degree of exactitude. This is especially the case when the intensity of tooth pressure is high, and the tooth velocity also high, which will generally be the case in the driving of the propeller shafts of moderate sized and large vessels. It is therefore desirable to so arrange the drive that the shaft carrying the driving pinion or the like, and the shaft carrying the driven wheel or the like, can in every case be readily put into and maintained in correct relative position, and this without involving the employment of elements of great weight. At present it is usual to provide bearings on each side of the pinion and bearings on each side of the wheel. Moreover, the pinion is sometimes divided into two portions with a bearing between them. All these bearings are supported on, or rigidly attached to, the box or case which incloses the gear, or carried by, or attached to, members encircling this gear box. The relatively short distance between the bearings of either shaft, and the large diameter of the gear wheel employed with a large reduction ratio, render it difficult to maintain the pinion and wheel in sufficiently correct positions relatively to each other.

The present invention consists in a combination of parts suitably constructed and disposed with respect to each other whereby the above difficulty is overcome.

The invention will be described in the following specification and more specifically set forth in the annexed claims.

According to the invention the propeller shaft or shafts is or are extended forward in the vessel alongside the prime mover or prime movers, the gearing being placed at the forward end of the prime mover or movers. Bearings are provided for the prime mover and propeller shafts at both ends of the prime mover or movers, and these bearings can, if desired, be carried by or rigidly attached to the casing or non-moving part of the prime mover or movers. Great rigidity can thus be obtained, while the relatively great axial distance between the bearings is of course very advantageous in arranging and maintaining correct alinement.

Referring to the accompanying drawings:—Figure 1 illustrates diagrammatically a convenient arrangement for carrying my invention into effect in a case where the propeller shaft is driven through toothed gearing by two steam turbines. Fig. 2 illustrates diagrammatically a modification in which an internally-toothed gear wheel is employed. Fig. 3 illustrates a modification of Fig. 1 in which additional bearings are provided for the shafts of the prime movers.

In all the figures *a* is a high pressure turbine and *b* is its shaft.

*c* is a low pressure turbine and *d* is its shaft.

*e* is the driving pinion on the shaft *b*, and *f* the driving pinion on the shaft *d*.

*g* is the propeller shaft, *h* the propeller, and *k* the gear wheel on the propeller shaft which meshes with, and is driven by, the pinions *e* and *f*.

*m*, *n* and *o* are bearings for the high pressure turbine shaft, low pressure turbine shaft, and propeller shaft respectively, all being located at the aft ends of the turbines.

*p*, *q* and *r* are bearings for the high pressure turbine shaft, low pressure turbine shaft, and propeller shaft respectively, these bearings being located at the forward ends of the turbines and aft of the gearing.

The bearings $m$, $n$ and $o$ are rigidly connected to each other and to the turbine casings. The bearings $p$, $q$ and $r$ are also rigidly connected together and to the turbine casings. The three bearings of each set are preferably so formed or connected together as to constitute, as regards rigidity, a single structure.

In Figs. 1 and 3 $k$ is an externally toothed wheel. In Fig. 2 the wheel $k$ is provided with internal teeth: that is, it envelops the pinions $e$ and $f$. When $k$ is externally toothed, the shafts $b$ and $d$ may, if desired and as shown in Fig. 3, be extended forward of the gear wheels and provided with bearings $s$ and $t$. These additional bearings may, if desired, be rigidly connected to the bearings $p$ and $q$ and also, if desired, directly connected to each other. When $k$ is internally toothed as in Fig. 2, bearings such as $s$ and $t$ cannot of course be employed, but a bearing $u$ may, if desired, be provided for the propeller shaft forward of the gear wheel. A similar bearing for the propeller shaft forward of the gear wheel might, if desired, be provided when $k$ is externally-toothed as in Figs. 1 and 3. The arrows $v$, $w$ and $x$ show the direction of rotation of the three shafts in all the figures.

My invention is equally applicable when a propeller shaft is driven by one prime mover instead of two. It is also applicable if it is desired to drive a propeller shaft by more than two prime movers. In the latter case all the driving shafts would be provided with pinions meshing with a single gear wheel on the propeller shaft and the driving shafts would necessarily not all be in the one plane. Any suitable prime mover or prime movers might be employed.

Although I have referred to the propeller shaft as extending forward to the gear wheel, there might of course be any number of couplings, flexible or rigid, between the propeller and the bearing $o$.

When the term "propeller shaft" is used, it is to be understood that this includes the shaft which extends from the bearing $o$ to the gear wheel and is either formed integrally with, or is coupled to, the shaft which carries the propeller. A ship may of course be provided with two or more independent propeller shafts, each driven according to the present invention.

What I claim as new and desire to secure by Letters Patent is:—

1. In combination with a ship, a prime mover adapted to propel the ship and comprising a fixed casing and a rotatable shaft, a propeller shaft extended forward alongside said prime mover, a gear wheel on said prime mover shaft forward of said prime mover casing, a gear wheel on said propeller shaft adapted to mesh with said gear wheel on said prime mover shaft, bearings for said prime mover shaft and said propeller shaft at the forward end of said prime mover casing and adjacent to said gear wheels, these bearings being rigidly connected together, and bearings for said prime mover shaft and said propeller shaft at the aft end of said prime mover casing, these bearings also being rigidly connected together.

2. In combination with a ship, a pair of prime movers adapted to propel the ship, and each comprising a fixed casing and a rotatable shaft, a propeller shaft extended forward alongside and between said prime movers, gear wheels on said prime mover shafts forward of said prime mover casings, a gear wheel on said propeller shaft adapted to mesh with said gear wheels on said prime mover shafts, bearings for said prime mover shafts and said propeller shaft at the forward ends of said prime mover casings and adjacent to said gear wheels, these bearings being rigidly connected together, and bearings for said prime mover shafts and said propeller shaft at the aft ends of said prime mover casings, these bearings also being rigidly connected together.

3. In combination with a ship, a prime mover adapted to propel the ship and comprising a fixed casing and a rotatable shaft, a propeller shaft extended forward alongside said prime mover, a gear wheel on said prime mover shaft forward of said prime mover casing, a gear wheel on said propeller shaft adapted to mesh with said gear wheel on said prime mover shaft, bearings for said prime mover shaft and said propeller shaft rigidly connected to each other and to the forward end of said prime mover casing and situated adjacent to said gear wheels, and bearings for said prime mover shaft and said propeller shaft rigidly connected to each other and to the aft end of said prime mover casing.

4. In combination with a ship, a pair of prime movers adapted to propel the ship, and each comprising a fixed casing and a rotatable shaft, a propeller shaft extended forward alongside and between said prime movers, gear wheels on said prime mover shafts forward of said prime mover casings, a gear wheel on said propeller shaft adapted to mesh with said gear wheels on said prime mover shafts, bearings for said prime mover shafts and said propeller shaft rigidly connected to each other and to the forward ends of said prime mover casings and situated adjacent to said gear wheels, and bearings for said prime mover shafts and said propeller shaft rigidly connected to each other and to the aft ends of said prime mover casings.

5. In combination with a ship, a prime mover adapted to propel the ship and comprising a fixed casing and a rotatable shaft, a propeller shaft extended forward alongside said prime mover, a gear wheel on said prime mover shaft forward of said prime mover casing, a gear wheel on said propeller shaft adapted to mesh with said gear wheel on said prime mover shaft, bearings for said prime mover shaft and said propeller shaft between the said gear wheels and the forward end of said prime mover casing, these bearings being rigidly connected together, bearings for said prime mover shaft and said propeller shaft at the aft end of said prime mover casing, these bearings also being rigidly connected together, and an additional bearing for said propeller shaft forward of said gear wheels.

6. In combination with a ship, a prime mover adapted to propel the ship and comprising a fixed casing and a rotatable shaft, a propeller shaft extended forward alongside said prime mover, a gear wheel on said prime mover shaft forward of said prime mover casing, an externally-toothed gear wheel on said propeller shaft adapted to mesh with said gear wheel on said prime mover shaft, bearings for said prime mover shaft and said propeller shaft between the said gear wheels and the forward end of said prime mover casing, these bearings being rigidly connected together, bearings for said prime mover shaft and said propeller shaft at the aft end of said prime mover casing, these bearings also being rigidly connected together, and an additional bearing for said prime mover shaft forward of said gear wheels, this additional bearing being rigidly connected to the first-mentioned bearings.

7. In combination with a ship, a pair of prime movers adapted to propel the ship, and each comprising a fixed casing and a rotatable shaft, a propeller shaft extended forward alongside and between said prime movers, gear wheels on said prime mover shafts forward of said prime mover casings, an externally-toothed gear wheel on said propeller shaft adapted to mesh with said gear wheels on said prime mover shafts, bearings for said prime mover shafts and said propeller shaft between the said gear wheels and the forward ends of said prime mover casings, these bearings being rigidly connected together, bearings for said prime mover shafts and said propeller shaft at the aft ends of said prime mover casings, these bearings also being rigidly connected together, and additional bearings for said prime mover shafts forward of said gear wheels, these additional bearings being rigidly connected to the first-mentioned bearings.

In testimony whereof I have signed my name to this specification in the presence of two subscribing witnesses.

JAMES GEORGE WEIR.

Witnesses:
 JAMES DAYTON IMRIE,
 JOHN GIRVAN.

Copies of this patent may be obtained for five cents each, by addressing the "Commissioner of Patents, Washington, D. C."